United States Patent
Zhang

(10) Patent No.: US 10,510,136 B2
(45) Date of Patent: Dec. 17, 2019

(54) IMAGE BLURRING METHOD, ELECTRONIC DEVICE AND COMPUTER DEVICE

(71) Applicant: GUANGDONG OPPO MOBILE TELECOMMUNICATIONS CORP., LTD., Dongguan, Guangdong (CN)

(72) Inventor: Gong Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 21 days.

(21) Appl. No.: 15/893,597

(22) Filed: Feb. 10, 2018

(65) Prior Publication Data

US 2018/0350031 A1 Dec. 6, 2018

(30) Foreign Application Priority Data

May 31, 2017 (CN) .......................... 2017 1 0399856

(51) Int. Cl.
*G06T 3/00* (2006.01)
*G06T 5/00* (2006.01)
(Continued)

(52) U.S. Cl.
CPC ............ *G06T 3/0093* (2013.01); *G06T 5/002* (2013.01); *G06T 7/70* (2017.01); *H04N 5/2621* (2013.01);
(Continued)

(58) Field of Classification Search
CPC ......... G06T 3/0093; G06T 7/70; G06T 5/002; G06T 2207/20012; G06T 2207/10024;
(Continued)

(56) References Cited

U.S. PATENT DOCUMENTS 9,237,277 B1 * 1/2016 Gulliver ............. H04N 5/23212
2008/0002961 A1 1/2008 Sundstrom
(Continued)

FOREIGN PATENT DOCUMENTS

CN 102932541 A 2/2013
CN 103207664 A 7/2013
(Continued)

OTHER PUBLICATIONS

European Patent Application 18161906.5 extended Search and Opinion dated May 14, 2018, 8 pages.
(Continued)

*Primary Examiner* — Timothy J Henn
(74) *Attorney, Agent, or Firm* — Lathrop Gage LLP

(57) ABSTRACT

Embodiments of the present disclosure provide an image blurring method, an electronic device, and a computer device. The method includes obtaining an image to be processed and physical distance information corresponding to each pixel in the image; detecting a first area comprising a part of a photographed object in the image, obtaining physical distance information corresponding to a second area comprising the photographed object and obtaining physical distance information corresponding to a third area other than the second area in the image according to the physical distance information corresponding to each pixel and the first area; obtaining a blur parameter corresponding to the third area according to the physical distance information corresponding to the second area and the physical distance information corresponding to the third area; and performing a blurring processing on the third area according to the blur parameter.

17 Claims, 5 Drawing Sheets

(51) Int. Cl.
*G06T 7/70* (2017.01)
*H04N 5/262* (2006.01)
(52) U.S. Cl.
CPC ............... *G06T 2207/10024* (2013.01); *G06T 2207/10028* (2013.01); *G06T 2207/20012* (2013.01); *H04N 2201/325* (2013.01)
(58) Field of Classification Search
CPC ........ G06T 2207/10028; H04N 5/2621; H04N 2201/325
See application file for complete search history.

(56) References Cited

U.S. PATENT DOCUMENTS

| | | | |
|---|---|---|---|
| 2009/0109304 A1* | 4/2009 | Guan | H04N 5/23212 348/240.99 |
| 2012/0320239 A1* | 12/2012 | Uehara | H04N 5/23212 348/239 |
| 2014/0152886 A1* | 6/2014 | Morgan-Mar | H04N 5/23212 348/349 |
| 2014/0185870 A1* | 7/2014 | Yoshida | H04N 5/23212 382/103 |
| 2014/0233853 A1* | 8/2014 | Fransson | G06K 9/60 382/173 |
| 2015/0116353 A1 | 4/2015 | Miura et al. | |
| 2015/0264271 A1 | 9/2015 | Yang et al. | |
| 2016/0028944 A1* | 1/2016 | Ikeda | H04N 5/23219 348/239 |
| 2016/0307324 A1 | 10/2016 | Nakada et al. | |
| 2016/0310001 A1 | 10/2016 | Lai | |
| 2016/0328853 A1* | 11/2016 | Wu | G06T 7/73 |
| 2019/0028630 A1* | 1/2019 | Zeng | H04N 5/232 |

FOREIGN PATENT DOCUMENTS

| | | |
|---|---|---|
| CN | 103905725 A | 7/2014 |
| CN | 103945118 A | 7/2014 |
| CN | 104333700 A | 2/2015 |
| CN | 105049695 A | 11/2015 |
| CN | 105389801 A | 3/2016 |
| CN | 106060423 A | 10/2016 |
| CN | 106203292 A | 12/2016 |
| CN | 106331492 A | 1/2017 |
| CN | 106993112 A | 7/2017 |
| CN | 107038681 A | 8/2017 |
| EP | 2683169 A2 | 1/2014 |
| EP | 2919188 A1 | 9/2015 |
| TW | 201707438 A | 2/2017 |
| WO | WO 2016199209 A1 | 12/2016 |

OTHER PUBLICATIONS

PCT/CN2018/084279 English translation of International Search Report and Written Opinion dated Jul. 30, 2018, 10 pages.
Taiwan Patent Application No. 18161906.5 Office Action dated Sep. 6, 2018, 8 pages.
Chinese Patent Application No. 201710399856.4 English translation of Office Action dated Apr. 22, 2019, 9 pages.

* cited by examiner

S402 an image to be processed and physical distance information corresponding to each pixel in the image to be processed are obtained

S404 a first area including a part of a photographed object in the image to be processed is detected, and a distance range for the photographed object is obtained according to the physical distance information corresponding to the first area, and physical distance information within the distance range is obtained as the physical distance information corresponding to the second area and physical distance information beyond the distance range is obtained as the physical distance information corresponding to the third area

S406 a blur parameter corresponding to the third area is obtained according to the physical distance information corresponding to the second area and the physical distance information corresponding to the third area

S408 a blurring processing is performed according to the blur parameter

Fig. 4

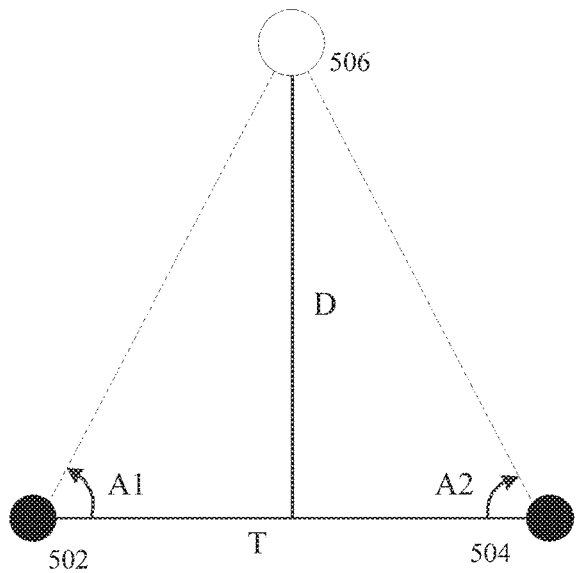

Fig. 5

IMAGE BLURRING METHOD, ELECTRONIC DEVICE AND COMPUTER DEVICE

CROSS-REFERENCE TO RELATED APPLICATIONS

This application is based on and claims priority of Chinese Patent Application No. 201710399856.4, filed on May 31, 2017, the entire contents of which are incorporated herein by reference.

FIELD

The present disclosure relates to a field of computer technologies, and more particularly, to an image blurring method, an electronic device and a computer device.

BACKGROUND

Nowadays, photography is becoming more and more inseparable from people's life, and with the development of intelligent terminal, the photography is used widely after intelligent terminals realize functions of taking photos. At the same time, both in personal life and commercial use, requirements for qualities of photography and user experiences are becoming higher and higher.

However, scenes of taking photos are complicated and changeable. In order to adapt to the complicated and changeable scenes, and highlight photographed objects to reflect layering effect, the usual method is to remain clarity of the photographed objects, and to perform a blurring processing on the areas other than the photographed objects. The blurring processing is to blur areas other than the photographed objects, so that the photographed objects are prominent. The blurring method in the related art is to recognize the main object in the image first, and then perform blurring on the areas other than the main object in the same degree.

SUMMARY

Embodiments of the present disclosure provide an image blurring method, an electronic device, a computer readable storage medium and a computer device.

Embodiments of the present disclosure provide an image blurring method, including: obtaining an image to be processed and physical distance information corresponding to each pixel in the image; detecting a first area including a part of a photographed object in the image, and obtaining physical distance information corresponding to a second area including the photographed object and obtaining physical distance information corresponding to a third area other than the second area in the image according to the physical distance information corresponding to each pixel and the first area; obtaining a blur parameter corresponding to the third area according to the physical distance information corresponding to the second area and the physical distance information corresponding to the third area; and performing a blurring processing on the third area according to the blur parameter.

Embodiments of the present disclosure provide an electronic device, including: an imaging obtaining module, an area obtaining module, a parameter obtaining module and an image blurring module. The imaging obtaining module is configured to obtain an image to be processed and physical distance information corresponding to each pixel in the image. The area obtaining module is configured to detect a first area including a part of a photographed object in the image, to obtain physical distance information corresponding to a second area including the photographed object and obtain physical distance information corresponding to a third area other than the second area in the image according to the physical distance information corresponding to each pixel and the first area. The parameter obtaining module is configured to obtain a blur parameter corresponding to the third area according to the physical distance information corresponding to the second area and the physical distance information corresponding to the third area. The image blurring module is configured to perform a blurring processing on the third area according to the blur parameter.

Embodiments of the present disclosure provide a computer readable storage medium, configured to store computer programs. When executed by a processor, the computer programs implement the following acts: obtaining an image to be processed and physical distance information corresponding to each pixel in the image; detecting a first area including a part of a photographed object in the image, obtaining physical distance information corresponding to a second area including the photographed object and obtaining physical distance information corresponding to a third area other than the second area in the image according to the physical distance information corresponding to each pixel and the first area; obtaining a blur parameter corresponding to the third area according to the physical distance information corresponding to the second area and the physical distance information corresponding to the third area; and performing a blurring processing on the third area according to the blur parameter.

Embodiments of the present disclosure provide a computer device, including a memory, a processor and computer programs stored on the memory and executable by the processor. When executing the programs, the processor implements the following acts: obtaining an image to be processed and physical distance information corresponding to each pixel in the image; detecting a first area including a part of a photographed object in the image, obtaining physical distance information corresponding to a second area including the photographed object and obtaining physical distance information corresponding to a third area other than the second area in the image according to the physical distance information corresponding to each pixel and the first area; obtaining a blur parameter corresponding to the third area according to the physical distance information corresponding to the second area and the physical distance information corresponding to the third area; and performing a blurring processing on the third area according to the blur parameter.

BRIEF DESCRIPTION OF THE DRAWING

FIG. 4 is a flow chart of an image blurring method in another embodiment of the present disclosure.

FIG. 5 is a schematic diagram illustrating a process of obtaining physical distance information in an embodiment of the present disclosure.

DETAILED DESCRIPTION

In order to make the purpose, the technical solutions and advantages of the present disclosure more clear, reference will be made in detail to the present disclosure with the accompanying drawings and the embodiments. It should be understood that, the embodiments described herein are merely used to explain the present disclosure, and are not intended to limit the present disclosure.

It may be understood that, terms such as "first" and "second" are used herein for describing various elements, these elements should not be limited by these terms. These terms are only used for distinguishing one element from another element. For example, a first client may also be called a second client, and similarly, the second client may also be called the first client, without departing from the scope of the present disclosure. The first client and the second client are both a client, but are not the same client.

Figure 1:
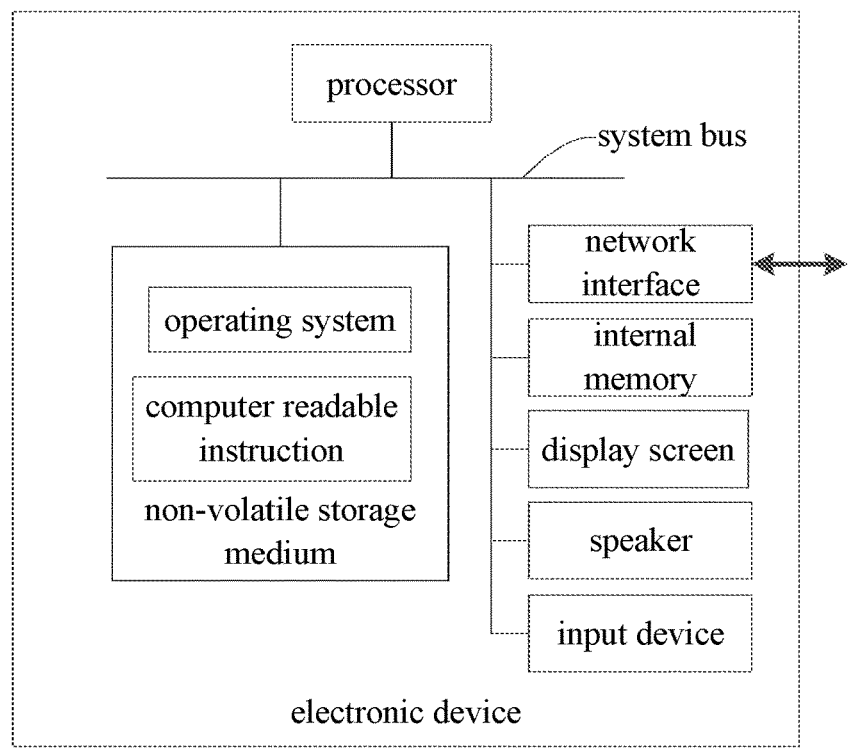
FIG. 1 is a schematic diagram of an internal structure of an electronic device in an embodiment of the present disclosure.

FIG. 1 is a schematic diagram of an internal structure of an electronic device in an embodiment of the present disclosure. As illustrated in FIG. 1, the electronic device includes a processor, a non-volatile storage medium, an internal memory and a network interface, a display screen and an input device coupled via a system bus. The non-volatile storage medium of the electronic device stores an operating system and computer readable instructions. The computer readable instructions are configured to implement an image blurring method when executed by the processor. The processor is configured to provide computing and control capabilities to support the operation of the entire electronic device. The internal memory in the electronic device provides an environment for running the computer readable instructions in the non-volatile storage medium. The network interface is configured to communicate with a server, such as send an image blurring request to the server and receive a blur parameter returned by the server. The display screen of the electronic device may be a liquid crystal display or an electronic ink display. The input device may be a touch layer covered on the display screen, or may be a button, a trackball or a touch pad arranged on a housing of the electronic device, or may be an external components such as a keyboard, a touch pad or a mouse, etc. The electronic device may be a mobile phone, a tablet computer or a personal digital assistant, a wearable device, or the like. It should be understood by those skilled in the art that, the structure illustrated in FIG. 1 is only a block diagram of structures related to solutions of the present disclosure, and does not constitute a limitation on the electronic device to which the solution of the present disclosure is applied. The specific electronic device may include more or less components than those illustrated in FIG. 1, or combinations thereof, or have a different arrangement of components.

Figure 2:
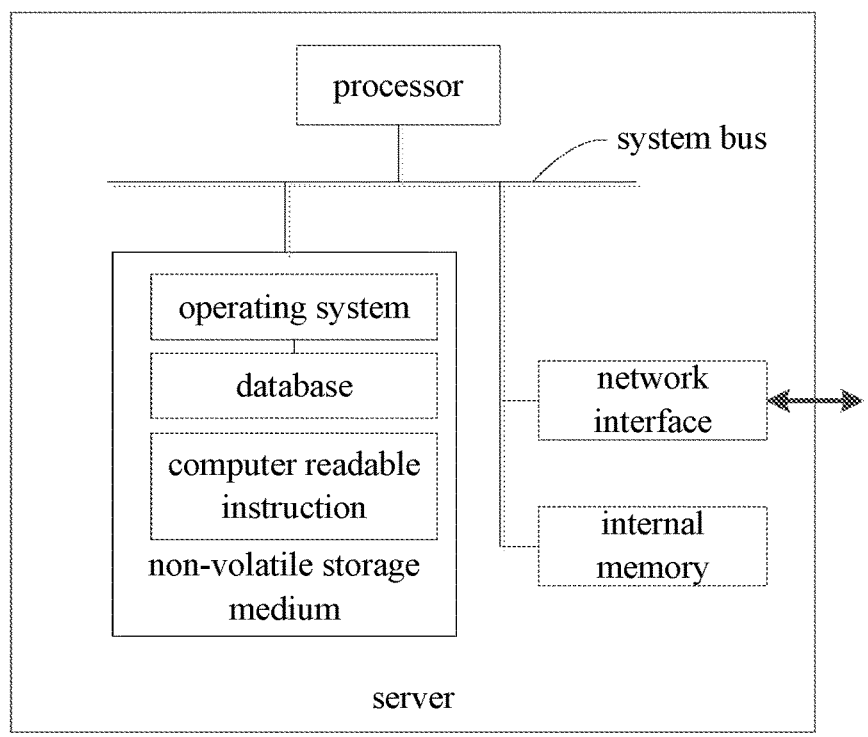
FIG. 2 is schematic diagram of an internal structure of a server in an embodiment of the present disclosure.

FIG. 2 is schematic diagram of an internal structure of a server in an embodiment of the present disclosure. As illustrated in FIG. 2, the server includes a processor, a non-volatile storage medium, an internal memory and a network interface coupled via a system bus. The non-volatile storage medium of the server stores an operating system and computer readable instructions. The computer readable instructions are configured to implement an image blurring method when executed by the processor. The processor of the server is configured to provide computing and control capabilities to support the operation of the entire electronic device. The network interface of the server is configured to communicate with an external terminal through a network connection, such as receive an image blurring request sent by the terminal and return a blur parameter to the terminal. The server may be implemented by an independent server or a server cluster composed of multiple servers. It should be understood by those skilled in the art that, the structure illustrated in FIG. 2 is only a block diagram of structures related to solutions of the present disclosure, and does not constitute a limitation on the server to which the solution of the present disclosure is applied. The specific server may include more or less components than those illustrated in FIG. 2, or combinations thereof, or have a different arrangement of components.

Figure 3:
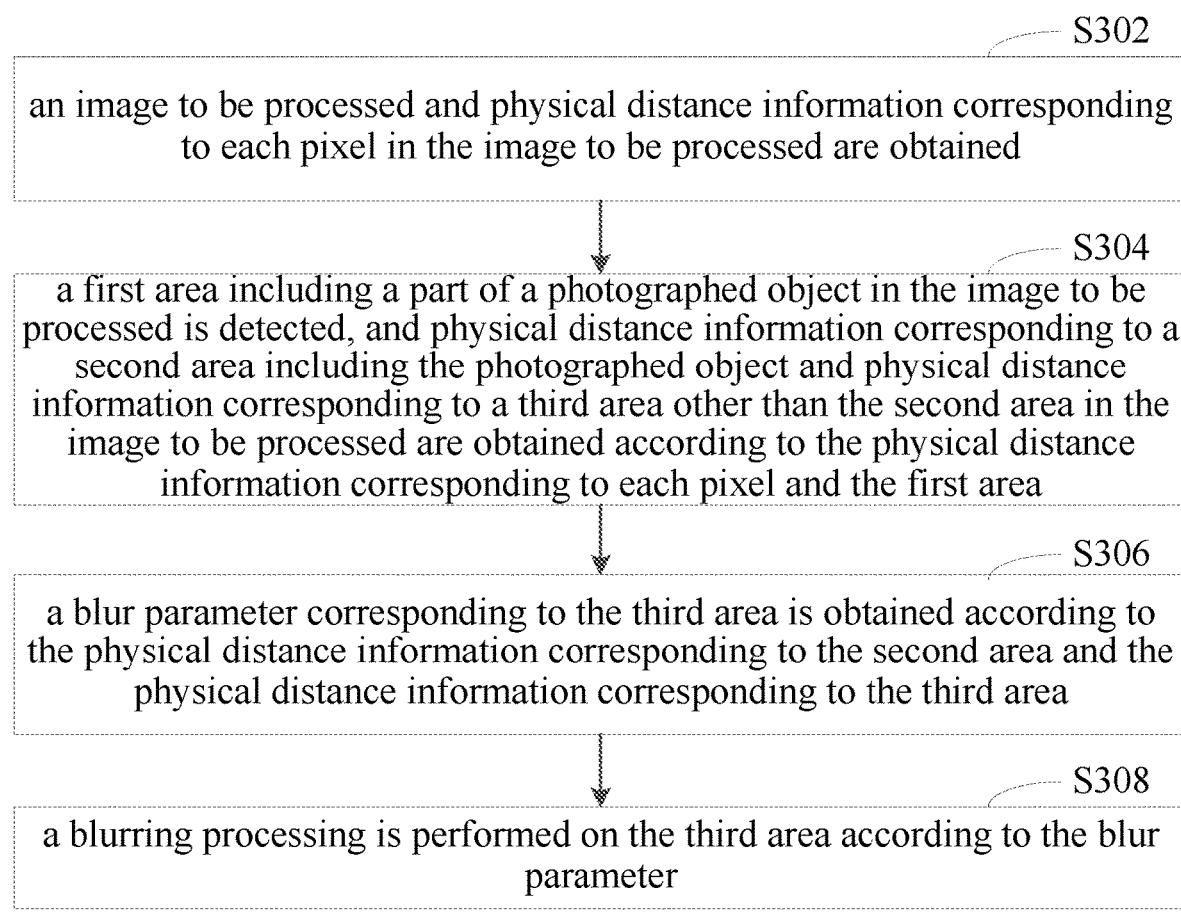
FIG. 3 is a flow chart of an image blurring method in an embodiment of the present disclosure.

FIG. 3 is a flow chart of an image blurring method in an embodiment of the present disclosure. As illustrated in FIG. 3, the image blurring method may include the following.

At block 302, an image to be processed and physical distance information corresponding to each pixel in the image to be processed are obtained.

In an embodiment of the present disclosure, the image to be processed refers to an image that needs to be blurred, and can be captured by an image capture device. The image capture device refers to a device for capturing images. For example, the image capture device may be a camera, a camera on a mobile terminal, a video camera, or the like. The physical distance information refers to related parameters indicating physical distances from the image capture device to objects corresponding to respective pixels in the image to be processed.

For example, when the image to be processed is acquired by a mobile terminal, a user inputs a photographing instruction through the mobile terminal, and after the mobile terminal detects the photographing instruction, the mobile terminal captures the image to be processed through a camera. The photographing instruction may be triggered by a physical button or a touch screen operation of the mobile terminal, or may be a speech instruction or the like.

At block 304, a first area including a part of a photographed object in the image to be processed is detected, and physical distance information corresponding to a second area including the photographed object and physical distance information corresponding to a third area other than the second area in the image to be processed are obtained according to the physical distance information corresponding to each pixel and the first area.

In an embodiment, the first area refers to an area where a part of the photographed object in the image to be processed is located. The second area refers to an area where the entire photographed object in the image to be processed is located. The third area refers to an area other than the second area in the image to be processed. In an embodiment, the photographed object may be a human portrait, the part of the photographed object may be a human face. The third area may be an area not including the photographed object, such as a background area in the image to be processed.

It is generally considered that the photographed object and a part of the photographed object are in the same vertical plane, and a physical distance from the photographed object to the image capture device is in the same range as a physical distance from the part of the photographed object to the image capture device. Therefore, after the physical distance information and the first area are obtained, the second area in the image to be processed can be obtained according to the physical distance corresponding to the first area, and the third area in the image to be processed can be determined according to the second area. Since each pixel in the image to be processed has corresponding physical distance information, after the second area and the third area in the image to be processed are obtained, the physical distance information corresponding to the second area and the physical distance information corresponding to the third area can be obtained.

At block 306, a blur parameter corresponding to the third area is obtained according to the physical distance information corresponding to the second area and the physical distance information corresponding to the third area.

In an embodiment of the present disclosure, the blurring processing refers to performing a fuzzifying processing on the image, and the blurring processing is performed according to the blur parameter. Different blur parameters lead to different degrees of the blurring processing. There is a correspondence between the physical distance information and the physical distance from the image capture device to the object. In an actual scene, the object may have different distances, which may be layered. Therefore, the blur parameter is obtained according to the physical distance information, and a blurring processing is performed according to the blur parameter. A blurring result may vary with the actual physical distance of the object.

At block 308, a blurring processing is performed on the third area according to the blur parameter.

With the above image blurring method, the first area in the image is recognized, and the second area and the third area in the image are determined according to the first area, and a blurring processing is performed on the third area to different degrees according to the physical distance information, so that the layered blurring of the third area can be realized, and the photographed object is prominent, thereby improving the accuracy of image processing.

FIG. 4 is a flow chart of an image blurring method in another embodiment of the present disclosure. As illustrated in FIG. 4, the image blurring method may include the following.

At block 402, an image to be processed and physical distance information corresponding to each pixel in the image to be processed are obtained In an embodiment of the present disclosure, two cameras may be installed on an image capture device, and the physical distance information from the image capture device to an object can be measured by the two cameras. In detail, images of the object are respectively captured by a first camera and a second camera. According to the images, a first inclined angle and a second inclined angle are acquired, in which, the first inclined angle is an angle between a line from the first camera to the object and a line from the first camera to the second camera, and the second angle is an angle between a line from the second camera to the object and a line from the second camera to the first camera. According to the first included angle, the second included angle and a distance from the first camera to the second camera, the physical distance information from the image capture device to the object is acquired.

FIG. 5 is a schematic diagram illustrating a process of obtaining physical distance information in an embodiment of the present disclosure. As illustrated in FIG. 5, images of the object 506 are respectively captured by the first camera 502 and the second camera 504. According to the images, the first inclined angle A1 and a second inclined angle A2 can be acquired. According to the first inclined angle A1, the second inclined angle A2 and the distance T between the first camera 502 and the second camera 504, the physical distance D between any point on the line from the first camera 502 to the second camera 504 and the object 506 can be acquired.

In another embodiment of the present disclosure, the physical distance information corresponding to each pixel in the image to be processed may also be obtained through a RGBD camera or a laser camera.

At block 404, a first area including a part of a photographed object in the image to be processed is detected, and a distance range for the photographed object is obtained according to the physical distance information corresponding to the first area, and physical distance information within the distance range is obtained as the physical distance information corresponding to the second area and physical distance information beyond the distance range is obtained as the physical distance information corresponding to the third area.

In an embodiment of the present disclosure, the distance range for the photographed object refers to a value range of the physical distance information corresponding to the second area including the photographed object in the image to be processed. Since the physical distance from the image capture device to the part of the photographed object and that from the image capture device to the photographed object can be regarded as equal, after the first area is detected, the physical distance information corresponding to the first area is obtained and the range of the physical distance information corresponding to the second area can be determined according to the physical distance information corresponding to the first area. The physical distance information within the range is configured as the physical distance information corresponding to the second area, and the physical distance information beyond the range is configured as the physical distance information corresponding to the third area.

Furthermore, the distance range is obtained according to the physical distance information corresponding to the first area, and an image area in the image to be processed is obtained according to the physical distance information within the distance range. Color information of the image area is obtained, and the second area in the image to be processed is obtained according to the color information. The physical distance information corresponding to the second area and the physical distance information corresponding to the third area are obtained according to the second area and the physical distance information corresponding to each pixel. The image area that is acquired according to the distance range is an area where an object within a same physical distance range as the part of the photographed object in the image to be processed is located. Assuming that there are other objects near the photographed object, there may be other objects besides the second area in the acquired image area. In this case, the second area can be further extracted according the color information of the image area.

In an embodiment of the present disclosure, the color information refers to parameters used to represent the color of the image. For example, the color information may include information such as the hue, saturation and value of the color in the image. The hue of the color refers to angle measurement of the color, the range of the angle is from 0 degree to 360 degrees, and the angle is calculated in a counterclockwise direction from red, in which, the angle of red is 0 degrees, the angle of green is 120 degrees, and the angle of blue is 240 degrees. The saturation refers to a degree of the color close to spectrum, and in general, the higher the saturation is, the more colorful the color is, the lower the saturation is, the dimmer the color is. The value indicates a degree of brightness of the color.

Color features of different objects may be different, i.e., the color information presented in the image may be different. For example, the color of trees is green, the color of sky is blue, and the color of earth is yellow etc. The second area and the area other than the second area can be acquired according to the color information in the image area.

In detail, color components of the image area can be acquired, and an area having color components within a preset range in the image area is extracted as the second area. The color component refers to an image component generated by converting the image to be processed into an image of the color dimension. For example, the color component may be a RGB color component, a CMY color component, an HSV color component, and the like of the image. It should be understood that, the RGB color component, the CMY color component and the HSV color component can be interchangeable.

In an embodiment, the HSV color component of the image area is acquired, and an area having the HSV color component within the preset range in the image area is extracted as the second area. The HSV color component refer to the hue (H) component, the saturation (S) component and the value (V) component of the image, respectively. A preset range is set for each of the three components respectively, and an area having these three components respectively within the preset ranges in the image area is extract as the second area.

Figure 6:
FIG. 6 is a schematic diagram illustrating a human portrait area in an image to be processed in an embodiment of the present disclosure.

For example, the second area is obtained by the HSV color component, in detail, the HSV color component of the image area can be obtained, and the area that satisfies a condition that "the value of H is within a range of 20~25, the value of S is within a range of 10~50, and the value of V is within a range of 50~85" is taken as the second area. FIG. 6 is a schematic diagram illustrating a human portrait area (second area) in an image to be processed in an embodiment of the present disclosure. FIG. 6 illustrates the display result of the human portrait area acquired according to the detected human face area and the physical distance information on a terminal.

At block 406, a blur parameter corresponding to the third area is obtained according to the physical distance information corresponding to the second area and the physical distance information corresponding to the third area.

In an embodiment of the present disclosure, an average distance for the photographed object is obtained according to the physical distance information corresponding to the second area, and a distance difference for the third area is obtained according to the average distance and the physical distance information corresponding to the third area, and the blur parameter corresponding to the third area is obtained according to the distance difference.

In other words, an average value (the average distance for the photographed object) of the physical distance information corresponding to the second area is obtained, and a difference value between the physical distance information corresponding to each pixel in the third area and the average value is obtained based on the physical distance information of the second area. The correspondence between the difference values and the blur parameters is set in advance, and the blur parameter corresponding to each pixel in the third area can be obtained according to the difference value and the correspondence. In general, the greater the difference value is, the farther the distance of the object corresponding to the pixel is, and the greater the corresponding blur parameter is, the deeper the degree of blurring is.

In addition, after the distance difference is obtained, the distance difference needs to be normalized, and the blur parameter corresponding to the third area is obtained according to the normalized distance difference. Normalization refers to converting the distance difference into a value within a range of 0~1, and the value within a range of 0~1 is used to reflect the degree of blurring.

For example, assuming that the average value of the physical distance information corresponding to the second area is A, and the physical distance information corresponding to a pixel in the third area is B(x, y), the distance difference corresponding to the pixel is $C(x, y)=|A-B(x, y)|$. Assuming that the maximum value and minimum value of C(x, y) are Cmax and Cmin, and the normalized distance difference is D(x, y), $D(x,y)=(C(x,y)-Cmin)/(Cmax-Cmin)$. In this way, the range of the normalized distance difference D(x, y) is 0 to 1. The degree of blurring is determined according to the distance difference, in which, 0 means that the blurring processing is not performed, and 1 means that intensity of blurring is maximum.

In addition, since the blurring processing is not performed when the distance difference is 0, and the third area needs to be blurred, the distance difference cannot be 0. Therefore, a mapping processing can be further performed on the normalized distance difference, and the blur parameter is obtained according to the mapped distance difference, so that the value of the blur parameter may not be zero. Assuming that $D(x, y) \in [0, 1]$ is mapped to $D(x, y) \in [0.5, 1]$, that is, the intensity of 0.5 refers to performing a blurring processing to a minimum, and the intensity of 1 refers to performing a blurring processing to a maximum. Assuming that the distance difference before mapping is $D_{old}(x, y)$, the mapped distance difference is $D_{new}(x, y)$, which can be calculated according to formula $D_{new}(x, y)=D_{old}(x, y)/2+0.5$, and $D_{new}(x, y) \in [0.5, 1]$. The blur parameter can be obtained according to the mapped distance difference, and a blurring processing is performed on the third area according to the blur parameter.

At block 408, a blurring processing is performed according to the blur parameter.

With the above image blurring method according to embodiments of the present disclosure, the first area in the image is recognized, and the second area and the third area in the image are determined according to the first area, and a blurring processing is performed on the third area to different degrees according to the physical distance information, thereby improving the accuracy of image processing.

Figure 7:
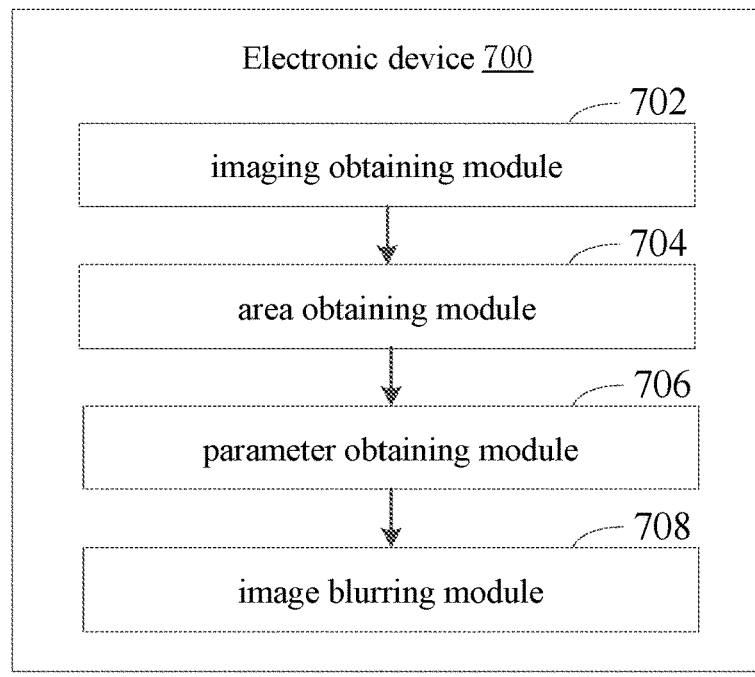
FIG. 7 is a block diagram of an electronic device in an embodiment of the present disclosure.

FIG. 7 is a block diagram of an electronic device in an embodiment of the present disclosure. As illustrated in FIG. 7, the electronic device 700 includes an imaging obtaining module 702, an area obtaining module 704, a parameter obtaining module 706 and an image blurring module 708.

The imaging obtaining module 702 is configured to obtain an image to be processed and physical distance information corresponding to each pixel in the image to be processed.

The area obtaining module 704 is configured to detect a first area including a part of a photographed object in the image to be processed, and to obtain physical distance information corresponding to a second area including the photographed object and physical distance information corresponding to a third area other than the second area in the image to be processed according to the physical distance information corresponding to each pixel and the first area.

The parameter obtaining module 706 is configured to obtain a blur parameter corresponding to the third area according to the physical distance information corresponding to the second area and the physical distance information corresponding to the third area.

The image blurring module 708 is configured to perform a blurring processing on the third area according to the blur parameter.

With the above electronic device, the first area in the image is recognized, and the second area and the third area in the image are determined according to the first area, and a blurring processing is performed on the third area to different degrees according to the physical distance information, thereby improving the accuracy of the image processing.

In an embodiment of the present disclosure, the area obtaining module 704 is further configured to obtain a distance range for the photographed object according to the physical distance information corresponding to the first area, and to obtain physical distance information within the distance range as the physical distance information corresponding to the second area and physical distance information beyond the distance range as the physical distance information corresponding to the third area.

In an embodiment, the area obtaining module 704 is further configured to obtain a distance range for the photographed object according to the physical distance information corresponding to the first area, and to obtain an image area in the image to be processed according to physical distance information within the distance range, to obtain color information of the image area, to obtain the second area in the image to be processed according to the color information, and to obtain the physical distance information corresponding to the second area and the physical distance information corresponding to the third area according to the second area and the physical distance information corresponding to each pixel.

In an embodiment of the present disclosure, the parameter obtaining module 706 is further configured to obtain an average distance for the photographed object according to the physical distance information corresponding to the second area, to obtain a distance difference for the third area according to the average distance and the physical distance information corresponding to the third area, and to obtain the blur parameter corresponding to the third area according to the distance difference.

In an embodiment, the parameter obtaining module 706 is further configured to normalize the distance difference to obtain normalized distance difference, and to obtain the blur parameter corresponding to the third area according to the normalized distance difference.

The division of modules in the above electronic device is only for illustration. In other embodiments, the electronic device may be divided into different modules according to requirements, so as to complete all or part of functions of the electronic device described above.

Embodiments of the present disclosure further provide a computer readable storage medium. The computer readable storage medium is configured to store computer programs. When the computer programs are executed by a processor, the computer programs implement the following acts: obtaining an image to be processed and physical distance information corresponding to each pixel in the image to be processed; detecting a first area including a part of a photographed object in the image to be processed, and obtaining physical distance information corresponding to a second area including the photographed object and physical distance information corresponding to a third area other than the second area in the image to be processed according to the physical distance information corresponding to each pixel and the human face area; obtaining a blur parameter corresponding to the third area according to the physical distance information corresponding to the first area and the physical distance information corresponding to the third area; and performing a blurring processing on the third area according to the blur parameter.

In an embodiment, the act of obtaining physical distance information corresponding to a second area and physical distance information corresponding to a third area according to the physical distance information corresponding to each pixel and the first area performed by the processor includes: obtaining a distance range for the photographed object according to the physical distance information corresponding to the first area, and obtaining physical distance information within the distance range as the physical distance information corresponding to the second area and physical distance information beyond the distance range as the physical distance information corresponding to the third area.

In an embodiment, the act of obtaining physical distance information corresponding to a second area and physical distance information corresponding to a third area according to the physical distance information corresponding to each pixel and the human face area performed by the processor includes: obtaining a distance range for the photographed object according to the physical distance information corresponding to the first area, and obtaining an image area in the image to be processed according to physical distance information within the distance range; obtaining color information of the image area, and obtaining the first area in the image to be processed according to the color information; and obtaining the physical distance information corresponding to the first area and the physical distance information corresponding to the third area according to the second area and the physical distance information corresponding to each pixel.

In an embodiment, the act of obtaining a blur parameter corresponding to the third area according to the physical distance information corresponding to the second area and the physical distance information corresponding to the third area performed by the processor includes: obtaining an average distance for the photographed object according to the physical distance information corresponding to the second area, and obtaining a distance difference for the third area according to the average distance and the physical distance information corresponding to the third area; and obtaining the blur parameter corresponding to the third area according to the distance difference.

In an embodiment, the act of obtaining the blur parameter corresponding to the third area according to the distance difference performed by the processor includes: normalizing the distance difference to obtain normalized distance difference, and obtaining the blur parameter corresponding to the third area according to the normalized distance difference.

Figure 8:
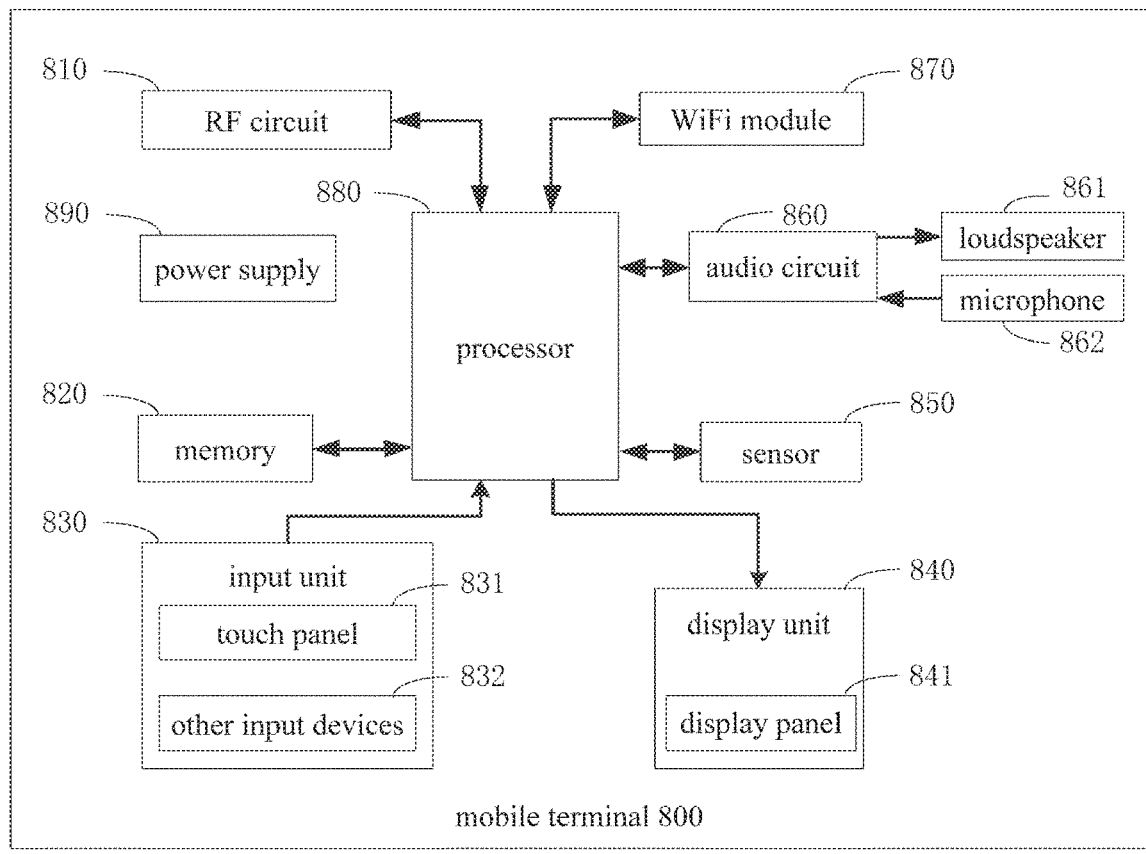
FIG. 8 is a block diagram of a structure of a mobile terminal related to a computer device according to an embodiment of the present disclosure.

Embodiments of the present disclosure further provide a computer device. As illustrated in FIG. 8, for convenience of description, only parts related to the embodiments of the present disclosure are illustrated, and for specific technical details that are not disclosed, please refer to related descriptions of the method embodiments. The computer device may be any terminal device including a mobile phone, a tablet computer, a personal digital assistant (PDA), a point of sales (POS), a vehicle-mounted computer, a wearable device, and the like. The mobile terminal configured as the computer device is taken as an example for illustration.

FIG. 8 is a block diagram of a structure of a mobile terminal related to a computer device according to an embodiment of the present disclosure. Referring to FIG. 8, the mobile terminal may include a radio frequency (RF) circuit 810, a memory 820, an input unit 830, a display unit 840, a sensor 850, an audio circuit 860, a wireless fidelity (WiFi) module 870, a processor 880, a power supply 890 and the like. It will be understood by those skilled in the art that, the structure of the mobile terminal illustrated in FIG. 8 does not constitute a limitation on the mobile terminal. The mobile terminal may include less or more components than those illustrated in FIG. 8 or combinations thereof, or have a different arrangement of components.

The RF circuit 810 may be configured to receive and transmit signals during a process of transmitting and receiving a message or making a call. The RF circuit 810 may be configured to receive downlink data from a base station and to transmit the downlink data to the processor 880. Alternatively, the RF circuit 810 may be configured to transmit uplink data to the base station. In general, the RF circuit includes but is not limited to an antenna, at least one amplifier, a transceiver, a coupler, a low noise amplifier (LNA), a diplexer and the like. Furthermore, the RF circuit 810 may be further configured to communicate with other devices via wireless communication and network. The above wireless communication may adopt any communication standard or protocol, which includes but is not limited to global system of mobile communication (GSM), general packet radio service (GPRS), code division multiple access (CDMA), wideband code division multiple access (WCDMA), long term evolution (LTE), e-mail, short messaging service (SMS) and the like.

The memory 820 may be configured to store software programs or modules. The processor 880 is configured to execute various functional applications and data processes of the mobile terminal by running the software programs and modules stored in the memory 820. The memory 820 may mainly include a program storage region and a data storage region. The program storage region may store an operating system, at least one function required application (such as an application having a sound playing function, an application having an image playing function) and the like. The data storage region may store data produced by using the mobile terminal (such as audio data, an address book) and the like. In addition, the memory 820 may include a high speed random access memory and may include a non-volatility memory, such as at least one disk memory, a flash memory, or other volatility solid state memory.

The input unit 830 may be configured to receive figure or character information inputted and generate a key signal input related to a user setup or function control of the mobile terminal 800. In detail, the input unit 830 may include a touch panel 831 and other input devices 832. The touch panel 831 (also called as touch screen) may be configured to gather touch operations near or on the touch panel 831 (such as an operation on the touch panel 831 or near the touch panel 831 of the user with a finger, a stylus or other suitable objects or attachments), and drive corresponding coupled device according to a preset program. In an embodiment, the touch panel 831 may include a touch detection device and a touch controller. The touch detection device detects an orientation of the user's touch, detects a signal caused by the touch operation and sends the signal to the touch controller. The touch controller receives the touch information from the touch detection device, converts the touch information to touch point coordinates, and sends the touch point coordinates to the processor 880. Furthermore, the touch controller may receive and execute a command sent from the processor 880. The touch panel 831 may be implemented as a resistive type, a capacitive type, an infrared type and a surface acoustic wave type touch panel. In addition to the touch panel 831, the input unit 830 may further include other input devices 832. In detail, the other input devices 832 may include but are not limited to one or more of a physical keyboard, a functional key (such as a volume control key, a switch key and the like).

The display unit 840 may be configured to display information inputted by the user or information provided to the user or various menus of the mobile terminal. The display unit 840 may include a display panel 841. In an embodiment, the display panel 841 may be configured as a liquid crystal display (LCD), an organic light-emitting diode (OLED) and the like. In an embodiment, the touch panel 831 may cover the display panel 841. When the touch panel 831 detects the touch operation on the touch panel 831 or near the touch panel 831, the touch operation is transmitted to the processor 880 to determine a type of the touch event. Thereafter, the processor 880 provides a corresponding visual output on the display panel 841 according to the type of the touch event. Although the touch panel 831 and the display panel 841 are two separate components in FIG. 8 to realize an input and output function of the mobile terminal, in certain embodiments, the touch panel 831 and the display panel 841 may be integrated to realize the input and output function of the mobile terminal.

The mobile terminal 800 may further include at least one sensor 850, such as an optical sensor, a motion sensor and other sensors. In detail, the optical sensor may include a surrounding light sensor and a proximity sensor. The surrounding light sensor may adjust a brightness of the display panel 841 according to surrounding lights. The proximity sensor may close the display panel 841 and/or backlight when the mobile terminal moves near ears of the user. The motion sensor may include an acceleration sensor. By the acceleration sensor the acceleration values in various directions can be measured, and a magnitude and a direction of gravity can be measured when the mobile terminal is static. The acceleration sensor can be used in identifying a posture of the mobile terminal (such as landscape/portrait screen switching), vibration recognition related functions (such as a pedometer, a knocking) and the like. Furthermore, the mobile terminal may be configured with a gyroscope, a barometer, a hygrometer, a thermometer, an infrared sensor and other sensors.

The audio circuit 860, a loudspeaker 861 and a microphone 862 may provide an audio interface between the user and the mobile terminal. The audio circuit 860 may receive audio data, convert the audio data to an electrical signal, and transmit the electrical signal to the loudspeaker 861. The loudspeaker 861 converts the electrical signal to a sound signal and output the sound signal. In another aspect, the microphone 862 may convert gathered sound signals to electrical signals. The audio circuit 860 receives and converts the electrical signals to audio data and outputs the audio data to the processor 880 for processing. The audio data processed by the processor 880 may be transmitted to another mobile terminal via the RF circuit 810 or may be stored in the memory 820 for further processing.

Wi-Fi is a short distance wireless communication technology. The mobile terminal may help the user to receive or send an e-mail, browse webpages, access to stream medium via the Wi-Fi module 880. The Wi-Fi module 870 provides wireless broadband Internet access service to the user. Although the Wi-Fi module 870 is illustrated in FIG. 8, it may be understood that, the Wi-Fi module 870 is not essential for the mobile terminal 800, thus it may be omitted according to demands.

The processor 880 is a control center of the mobile terminal, which utilizes various interfaces and wires to couple various parts of the mobile terminal. By running or executing the software program and/or modules stored in the memory 820, and by invoking data stored in the memory 820, the various functions and data processing functions may be executed, thus integrally monitoring the mobile terminal. In an embodiment, the processor 880 may include one or more processing units. In an embodiment, the processor 880 may be integrated with an application processor and a modem processor. The application processor mainly processes the operating system, a user interface and an application. The modem processor mainly processes wireless communication. It may be understood that, the above modem processor may be not integrated in the processor 880.

The mobile terminal 800 may further include a power supply 890 (such as a battery) for providing power to various components of the mobile terminal. Preferably, the power supply may be logically coupled to the processor 880 via a power management system, thereby managing charging, discharging and power consumption via the power management system.

In embodiments of the present disclosure, when the processor 880 included in the mobile terminal 800 executes the computer programs stored in the memory, the processor 880 performs the following acts: obtaining an image to be processed and physical distance information corresponding to each pixel in the image to be processed; detecting a human face area in the image to be processed, and obtaining physical distance information corresponding to a human portrait area and physical distance information corresponding to a third area according to the physical distance information corresponding to each pixel and the human face area; obtaining a blur parameter corresponding to the third area according to the physical distance information corresponding to the human portrait area and the physical distance information corresponding to the third area; and performing a blurring processing on the third area according to the blur parameter.

In an embodiment, the act of obtaining physical distance information corresponding to a human portrait area and physical distance information corresponding to a third area according to the physical distance information corresponding to each pixel and the human face area performed by the processor 880 includes: obtaining a human portrait distance range according to the physical distance information corresponding to the human face area, and obtaining physical distance information within the human portrait distance range as the physical distance information corresponding to the human portrait area and physical distance information beyond the human portrait distance range as the physical distance information corresponding to the third area.

In embodiments of the present disclosure, the act of obtaining physical distance information corresponding to a human portrait area and physical distance information corresponding to a third area according to the physical distance information corresponding to each pixel and the human face area performed by the processor 880 includes: obtaining a human portrait distance range according to the physical distance information corresponding to the human face area, and obtaining an image area in the image to be processed according to physical distance information within the human portrait distance range; obtaining color information of the image area, and obtaining the human portrait area in the image to be processed according to the color information; and obtaining the physical distance information corresponding to the human portrait area and the physical distance information corresponding to the third area according to the human portrait area and the physical distance information corresponding to each pixel.

In an embodiment, the act of obtaining a blur parameter corresponding to the third area according to the physical distance information corresponding to the human portrait area and the physical distance information corresponding to the third area performed by the processor 880 includes: obtaining a human portrait average distance according to the physical distance information corresponding to the human portrait area, and obtaining a distance difference for the third area according to the human portrait average distance and the physical distance information corresponding to the third area; and obtaining the blur parameter corresponding to the third area according to the distance difference. In an embodiment, the act of obtaining the blur parameter corresponding to the third area according to the distance difference performed by the processor 880 includes: normalizing the distance difference to obtain normalized distance difference, and obtaining the blur parameter corresponding to the third area according to the normalized distance difference.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed. The storage medium may be a magnetic disk, an optical disk, a read-only memory (ROM), or the like.

The above embodiments illustrate merely some implementations of the present disclosure, which are described in details but are not construed to limit the scope of the present disclosure. It should be pointed that, for those skilled in the art, without departing from the principle of the present disclosure, various changes and improvements may be made, which are covered by the protection scope of the present disclosure. Therefore, the protection scope of the present disclosure is according to the appended claims.

What is claimed is:

1. An image blurring method, comprising:
   obtaining an image to be processed and physical distance information corresponding to each pixel in the image;
   detecting a first area comprising a part of a photographed object in the image, obtaining a distance range corresponding to the first area, obtaining physical distance information within the distance range as physical distance information corresponding to a second area comprising the photographed object and obtaining physical distance information beyond the distance range as physical distance information corresponding to a third area other than the second area in the image;
   obtaining a blur parameter corresponding to the third area according to the physical distance information corresponding to the second area and the physical distance information corresponding to the third area; and
   performing a blurring processing on the third area according to the blur parameter.

2. The image blurring method according to claim 1, further comprising:
   obtaining an image area in the image according to physical distance information within the distance range;

obtaining color information of the image area, and obtaining the second area in the image according to the color information; and adjusting the physical distance information corresponding to the second area and the physical distance information corresponding to the third area according to the second area and the physical distance information corresponding to each pixel.

3. The image blurring method according to claim 2, wherein obtaining color information of the image area, and obtaining the second area in the image according to the color information comprises:

obtaining color components of the image area, and obtaining an area having color components within a preset range in the image area as the second area.

4. The image blurring method according to claim 1, wherein obtaining a blur parameter corresponding to the third area according to the physical distance information corresponding to the second area and the physical distance information corresponding to the third area comprises:

obtaining an average distance for the photographed object according to the physical distance information corresponding to the second area, and obtaining a distance difference for the third area according to the average distance and the physical distance information corresponding to the third area; and obtaining the blur parameter corresponding to the third area according to the distance difference.

5. The image blurring method according to claim 1, wherein obtaining a blur parameter corresponding to the third area according to the physical distance information corresponding to the second area and the physical distance information corresponding to the third area comprises:

obtaining an average distance for the photographed object according to the physical distance information corresponding to the second area, and obtaining a distance difference for the third area according to the average distance and the physical distance information corresponding to the third area; and obtaining the blur parameter corresponding to the third area according to the distance difference.

6. The image blurring method according to claim 2, wherein obtaining a blur parameter corresponding to the third area according to the physical distance information corresponding to the second area and the physical distance information corresponding to the third area comprises:

obtaining an average distance for the photographed object according to the physical distance information corresponding to the second area, and obtaining a distance difference for the third area according to the average distance and the physical distance information corresponding to the third area; and obtaining the blur parameter corresponding to the third area according to the distance difference.

7. The image blurring method according to claim 4, wherein obtaining the blur parameter corresponding to the third area according to the distance difference comprises:

normalizing the distance difference to obtain normalized distance difference, and obtaining the blur parameter corresponding to the third area according to the normalized distance difference.

8. The image blurring method according to claim 7, wherein obtaining the blur parameter corresponding to the third area according to the normalized distance difference comprises:

performing a mapping processing on the normalized distance difference to obtain a mapped distance difference; and obtaining the blur parameter corresponding to the third area according to the mapped distance difference.

9. An electronic device, comprising:

a processor; and a storage medium, having computer readable instructions stored therein that when executed by the processor cause the processor to:

obtain an image to be processed and physical distance information corresponding to each pixel in the image;

detect a first area comprising a part of a photographed object in the image, obtain a distance range corresponding to the first area, obtain physical distance information within the distance range as physical distance information corresponding to a second area comprising the photographed object and obtain physical distance information beyond the distance range as physical distance information corresponding to a third area other than the second area in the image;

obtain a blur parameter corresponding to the third area according to the physical distance information corresponding to the second area and the physical distance information corresponding to the third area; and perform a blurring processing on the third area according to the blur parameter.

10. The electronic device according to claim 9, wherein the computer readable instructions, when executed by the processor, further cause the processor:

obtain an image area in the image according to physical distance information within the distance range;

obtain color information of the image area, and obtain the second area in the image according to the color information; and adjust the physical distance information corresponding to the second area and the physical distance information corresponding to the third area according to the second area and the physical distance information corresponding to each pixel.

11. The electronic device according to claim 10, wherein the computer readable instructions, when executed by the processor, further cause the processor to obtain color information of the image area, and obtaining the second area in the image according to the color information by:

obtaining color components of the image area, and obtaining an area having color components within a preset range in the image area as the second area.

12. The electronic device according to claim 9, wherein the computer readable instructions, when executed by the processor, further cause the processor to:

obtain an average distance for the photographed object according to the physical distance information corresponding to the second area, and obtain a distance difference for the third area according to the average distance and the physical distance information corresponding to the third area; and obtain the blur parameter corresponding to the third area according to the distance difference.

13. The electronic device according to claim 9, wherein the computer readable instructions, when executed by the processor, further cause the processor to:

obtain an average distance for the photographed object according to the physical distance information corresponding to the second area, and obtain a distance difference for the third area according to the average distance and the physical distance information corresponding to the third area; and obtain the blur parameter corresponding to the third area according to the distance difference.

14. The electronic device according to claim 10, wherein the computer readable instructions, when executed by the processor, further cause the processor to:

obtain an average distance for the photographed object according to the physical distance information corresponding to the second area, and obtain a distance difference for the third area according to the average distance and the physical distance information corresponding to the third area; and obtain the blur parameter corresponding to the third area according to the distance difference.

15. The electronic device according to claim 12, wherein the computer readable instructions, when executed by the processor, further cause the processor to:

normalize the distance difference to obtain normalized distance difference, and obtain the blur parameter corresponding to the third area according to the normalized distance difference.

16. The electronic device according to claim 15, wherein the computer readable instructions, when executed by the processor, further cause the processor to obtain the blur parameter corresponding to the third area according to the normalized distance difference by:

performing a mapping processing on the normalized distance difference to obtain a mapped distance difference; and obtaining the blur parameter corresponding to the third area according to the mapped distance difference.

17. A computer device, comprising a memory, a processor and computer programs stored on the memory and executable by the processor, wherein, when executing the programs, the processor implements following acts:

obtaining an image to be processed and physical distance information corresponding to each pixel in the image;

detecting a first area comprising a part of a photographed object in the image, obtaining a distance range corresponding to the first area, obtaining physical distance information within the distance range as physical distance information corresponding to a second area comprising the photographed object and obtaining physical distance information beyond the distance range as physical distance information corresponding to a third area other than the second area in the image;

obtaining a blur parameter corresponding to the third area according to the physical distance information corresponding to the second area and the physical distance information corresponding to the third area; and performing a blurring processing on the third area according to the blur parameter.

* * * * *